(12) United States Patent
    Stahl et al.

(10) Patent No.: US 11,105,724 B2
(45) Date of Patent: Aug. 31, 2021

(54) ELECTROSTATIC PARTICLE SENSORS

(71) Applicant: CPT Group GmbH, Hannover (DE)

(72) Inventors: Christian Stahl, Obertraubling (DE); Patrick Eberl-Neumaier, Altfraunhofen (DE); Sebastian Reiß, Burglengenfeld (DE); Florian Koller, Lappersdorf (DE); Michael Nienhoff, Regensburg (DE)

(73) Assignee: VITESCO TECHNOLOGIES GMBH, Hanover (DE)

( * ) Notice: Subject to any disclaimer, the term of this patent is extended or adjusted under 35 U.S.C. 154(b) by 125 days.

(21) Appl. No.: 16/337,964

(22) PCT Filed: Sep. 18, 2017

(86) PCT No.: PCT/EP2017/073480
    § 371 (c)(1),
    (2) Date: Mar. 29, 2019

(87) PCT Pub. No.: WO2018/065201
    PCT Pub. Date: Apr. 12, 2018

(65) Prior Publication Data
    US 2020/0025666 A1    Jan. 23, 2020

(30) Foreign Application Priority Data
    Oct. 7, 2016 (DE) ..................... 10 2016 219 454.2

(51) Int. Cl.
    *G01N 15/06*    (2006.01)
    *F02D 41/14*    (2006.01)
    (Continued)

(52) U.S. Cl.
    CPC ..... *G01N 15/0656* (2013.01); *F02D 41/1466* (2013.01); *G01N 15/0606* (2013.01); *F02D 41/04* (2013.01); *G01N 1/2247* (2013.01)

(58) Field of Classification Search
    CPC ........... G01N 15/0656; G01N 15/0606; G01N 1/2247; F02D 41/1466; F02D 41/04; F02D 41/222; F02D 41/042; Y02T 10/40
    See application file for complete search history.

(56) References Cited

U.S. PATENT DOCUMENTS

| 7,278,304 B2 | 10/2007 | Zanini-Fisher et al. ... 73/114.71 |
| 2002/0021120 A1 | 2/2002 | Raichle et al. ................. 324/96 |

(Continued)

FOREIGN PATENT DOCUMENTS

| DE | 10 2005 039 915 A1 | 3/2007 | ............. G01N 15/06 |
| DE | 10 2014 206 252 A1 | 10/2015 | ............. F01N 11/00 |

(Continued)

OTHER PUBLICATIONS

German Office Action, Application No. 10 2016 219 454.2, 6 pages, dated Sep. 1, 2017.

(Continued)

*Primary Examiner* — Suman K Nath
(74) *Attorney, Agent, or Firm* — Slayden Grubert Beard PLLC

(57) ABSTRACT

Various embodiments include a method for checking a sensor for soot particles in exhaust of an engine comprising: generating a sensor current between a first electrode and a second electrode of the sensor, wherein the first electrode and the second electrode define a gap through which the exhaust gas flows between the electrodes, by applying a difference in potential between the electrodes, wherein soot particles accumulate on the electrodes and, after a dwell time dependent on the preloading of the electrodes with soot particles, they move from a first electrode to the respective second electrode generating a flow of current as a measure of the quantity of soot in the stream of exhaust gas; determining whether a peak in the sensor current is measured after the switching off of the internal combustion engine; and (Continued)

if no peak in the sensor current is measured, flagging the particle sensor as faulty.

5 Claims, 2 Drawing Sheets

(51) Int. Cl.
*F02D 41/04* (2006.01)
*G01N 1/22* (2006.01)

(56) References Cited

U.S. PATENT DOCUMENTS

| | | | |
|---|---|---|---|
| 2007/0056860 A1* | 3/2007 | Inagaki | G01N 27/417 |
| | | | 205/784.5 |
| 2009/0295400 A1 | 12/2009 | Wilhelm | 324/452 |
| 2013/0298534 A1* | 11/2013 | Yahata | F02D 41/1439 |
| | | | 60/276 |
| 2013/0318948 A1 | 12/2013 | Van Marion | 60/277 |
| 2018/0067090 A1* | 3/2018 | Hopka | G01N 33/007 |

FOREIGN PATENT DOCUMENTS

| | | | | |
|---|---|---|---|---|
| DE | 10 2014 220 846 A1 | 4/2016 | | F01N 11/00 |
| WO | WO-2016058771 A1 * | 4/2016 | | G01N 15/0606 |
| WO | 2018/065201 A1 | 4/2018 | | F02D 41/14 |

OTHER PUBLICATIONS

International Search Report and Written Opinion, Application No. PCT/EP2017/073480, 19 pages, dated Jan. 5, 2018.

* cited by examiner

ELECTROSTATIC PARTICLE SENSORS

CROSS-REFERENCE TO RELATED APPLICATIONS

This application is a U.S. National Stage Application of International Application No. PCT/EP2017/073480 filed Sep. 18, 2017, which designates the United States of America, and claims priority to DE Application No. 10 2016 219 454.2 filed Oct. 7, 2016, the contents of which are hereby incorporated by reference in their entirety.

TECHNICAL FIELD

The present disclosure relates to electrostatic particle sensors. Various embodiments include methods for checking the function of an electrostatic particle sensor, in particular of an electrostatic particle sensor for sensing soot particles in exhaust gases of an internal combustion engine, such as are used downstream of the particle filter in motor vehicles.

BACKGROUND

There are currently various concepts for soot sensors which monitor, for example, the function of a particle filter in the exhaust tract of vehicles and are therefore intended to contribute to reducing emissions. For example, electrostatic particle sensors are known in which soot particles move in an electrical field generated by at least two electrodes, and their impacting on one of the electrodes is measured as a flow of current.

Such an electrostatic particle sensor is known, for example, from DE 10 2005 039 915 A1. In a modified concept of this electrostatic particle sensor, the exhaust gas flows through a gap between a cylindrical inner electrode and an outer sheath electrode which is also cylindrical and which surrounds the inner electrode in a coaxial manner. The inner electrode is connected to a potential of, for example, 1000 V, while the outer electrode is connected to ground. Soot particles which move through the gap firstly accumulate on the inner electrode, on which, as result, a layer of soot particles builds up. If this layer is thick enough for a critical distance from the outer sheath electrode to be undershot, the soot particles become detached owing to the electrostatic forces and move to the sheath electrode, as a result of which a flow of current between the two electrodes is produced, which is measured as a sensor current, as a measure of the soot in the exhaust gas.

With this type of sensor there is no satisfactory possible way of diagnosing the characteristic curve of the sensor during the real measuring operation. Therefore, at the present time it is not possible to carry out sufficient plausibility checking of a measurement result of the sensor.

SUMMARY

The teachings of the present disclosure describe methods for checking the function of such an electrostatic particle sensor. For example, some embodiments include a method for checking the function of an electrostatic particle sensor (9) for sensing soot particles in exhaust gases of an internal combustion engine (3), wherein the particle sensor (9) has a first electrode (13) and a second electrode (15), wherein a gap (17) through which the exhaust gas flows is provided between the electrodes (13, 15), and the electrodes (13, 15) have a difference in potential, wherein soot particles accumulate on the electrodes (13, 15) and, after a dwell time which is dependent on the preloading of the electrodes (13) with soot particles, they move to the respective other electrode (15, 13), with the result that a flow of current is generated which is measured as a sensor current, as a measure of the quantity of soot in the stream of exhaust gas, wherein in order to check the function of the particle sensor (9) it is determined whether an increased sensor current in the form of a peak is briefly measured after the switching off of the internal combustion engine (3).

In some embodiments, a level of the peak and/or a surface area of the peak are/is determined in order to check the function of the particle sensor (9).

In some embodiments, the plausibility of measured values of the particle sensor (9) is checked in a time period $\Delta t$ before the switching off of the internal combustion engine (3) on the basis of the determined level and/or the surface area of the peak, wherein measured values of the particle sensor (9) are considered to be plausible if in the time period $\Delta t$ no soot was determined in the stream of exhaust gas and no increased sensor current is measured in the form of a peak; in the time period $\Delta t$ a small quantity of soot was determined in the stream of exhaust gas and an increased sensor current in the form of a relatively low peak is measured or in the time period $\Delta t$ a large quantity of soot was determined in the stream of exhaust gas and an increased sensor current in the form of a relatively high peak is measured.

In some embodiments, a defective particle filter (7) is assumed if in the time period $\Delta t$ no soot or a small quantity of soot was determined in the stream of exhaust gas and an increased sensor current in the form of a relatively high peak is measured.

In some embodiments, the checking of the function of the particle sensor (9) is carried out whenever the internal combustion engine (3) is switched off.

In some embodiments, the checking of the function of the particle sensor (9) is carried out at regular intervals.

As another example, some embodiments include a computer program product having a computer-readable medium and program code which is stored on the computer-readable medium and which, when it is executed on a computing unit (11), induces the computing unit (11) to execute a method as described above.

BRIEF DESCRIPTION OF THE DRAWINGS

The teachings are discussed in more detail below on the basis of exemplary embodiments and with reference to the appended drawings. In the figures.

DETAILED DESCRIPTION

Figure 1:
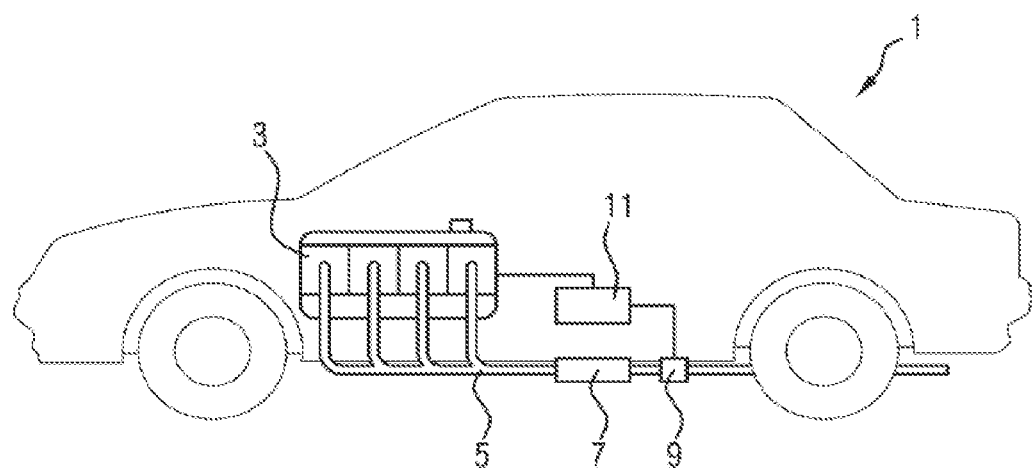
FIG. 1 shows a schematic view of a motor vehicle having an electrostatic particle sensor incorporating teachings of the present disclosure.

In some embodiments, there is a method for checking the function of an electrostatic particle sensor for sensing soot particles in exhaust gases of an internal combustion engine, wherein the particle sensor has a first electrode and a second electrode, wherein a gap through which exhaust gas flows is provided between the electrodes, and the electrodes have a difference in potential. Soot particles accumulate on the electrodes and, after a dwell time which is dependent on the loading of the electrodes with soot particles, they move to the respective other electrode, with the result that a flow of current is generated which is measured as a sensor current, as a measure of the quantity of soot in the stream of exhaust gas. In order to check the function of the particle sensor it is determined whether an increased sensor current in the form of a peak is briefly measured after the switching off of the internal combustion engine.

In this disclosure, a briefly increased sensor current is understood to be a sensor current which is significantly increased, for a period of, for example, several seconds, compared to currents occurring during normal operation. For example, the sensor current can be increased to twice or even 10 times the currents occurring during normal operation. In some embodiments, when the internal combustion engine is switched off with the described type of sensor, such a peak occurs, unless there was no soot present in the exhaust gas for a certain time before the switching off of the internal combustion engine. An explanation of the occurrence of this "switch-off peak" is that as a result of the flow speed in the sensor which changes abruptly to zero, the accumulations of particles lose their equilibrium and relatively large quantities of particles become detached and moved to the other electrode, with the result that a flow of current is registered.

This process can be used for checking the plausibility of the measured values of an electrostatic particle sensor and/or for checking its function. In some embodiments, possibilities are available, at least in many cases, for checking the plausibility of the measurement results of the sensor. For this purpose, in particular, a level of the peak and/or a surface area of the peak are/is determined in order to check the function of the particle sensor. In some embodiments, the maximum value which is reached can be used as the level of the peak. The surface area of the peak is defined as the integral over the peak.

In some embodiments, both the level of the peak and its surface area are suitable for checking the plausibility of preceding measurement results of the particle sensor. This can occur, in particular, in the way described below:

In some embodiments, the plausibility of measured values of the particle sensor is checked in a time period $\Delta t$ before the switching off of the internal combustion engine on the basis of the determined level and/or the surface area of the peak, wherein measured values of the particle sensor are considered to be plausible if in the time period $\Delta t$ no soot was determined in the stream of exhaust gas and no increased sensor current is measured in the form of a peak. In this first case, it is assumed that no soot loading has actually occurred, with the result that no soot loading, which would have been able to bring about the switch-off peak, was able to form on the sensor.

In addition, measured values of the particle sensor are considered to be plausible if in the time period $\Delta t$ a small quantity of soot was determined in the stream of exhaust gas and an increased sensor current in the form of a relatively low peak is measured. This second case relates to situations in which only a small degree of loading of the stream of exhaust gas is present. The particle sensor is frequently not reliably ready for measuring at such low concentrations. A detectable but small switch-off peak can indicate in this case that the previously determined small quantities of soot are plausible.

In addition, measured values of the particle sensor are considered to be plausible if in the time period $\Delta t$ a large quantity of soot was determined in the stream of exhaust gas and an increased sensor current in the form of a relatively high peak is measured. In this third case, a high degree of loading of soot in the stream of exhaust gas is present, with the result that a large quantity of soot is collected on the electrodes of the sensor and a significant switch-off peak is generated.

In some embodiments, in many typical situations the plausibility of the measured values of the particle sensor can easily be checked. In some embodiments, if implausible measured values occur repeatedly, the functional capability of the particle sensor is checked. In some embodiments, a defective particle filter is assumed if in the time period $\Delta t$ no soot or only a small quantity of soot was determined in the stream of exhaust gas and an increased sensor current in the form of a relatively high peak is measured.

As mentioned above, the measurement results of the particle sensor are not always reliable at low concentrations and/or the sensor is not always reliably ready to measure. If only low concentrations are measured in the time period $\Delta t$, which are then, however, accompanied by a high switch-off peak, this could indicate that in the time period $\Delta t$, a low soot concentration was incorrectly measured, while in truth a relatively high loading of soot was present. This could in turn indicate a defective particle filter.

In some embodiments, at very low soot concentrations there is a possibility of differentiating between a completely intact particle filter and a slightly damaged filter.

In some embodiments, the checking of the function of the particle sensor is carried out whenever the internal combustion engine is switched off. In some embodiments, the checking of the function of the particle sensor can also take place at regular intervals, wherein the intervals can be, for example, regular time intervals or checking of the function of the particle sensor can be carried out on a regular basis after a specific quantity of kilometers traveled. In some embodiments, regular checking of the function of the particle sensor takes place, with the result that the function of a particle filter which is monitored by means of the particle sensor can reliably take place.

In some embodiments, a computer program product includes a computer-readable medium and program code which is stored on the computer-readable medium which, when it is executed on a computing unit, induces the computing unit to execute the described method. The computing unit can be, in particular, a sensor control device or a control device of the internal combustion engine of a motor vehicle.

The motor vehicle 1 according to FIG. 1 has an internal combustion engine 3 comprising a diesel engine. The internal combustion engine 3 is assigned an exhaust gas tract 5 via which a stream of exhaust gas of the internal combustion engine 3 is discharged. Arranged in the exhaust gas tract 5 is a particle filter 7 for cleaning the exhaust gas, and an electrostatic particle sensor 9 which is connected downstream of the particle filter. An engine control device 11 is connected via signal lines both to the internal combustion engine 3 and to the electrostatic particle sensor 9.

Figure 2:
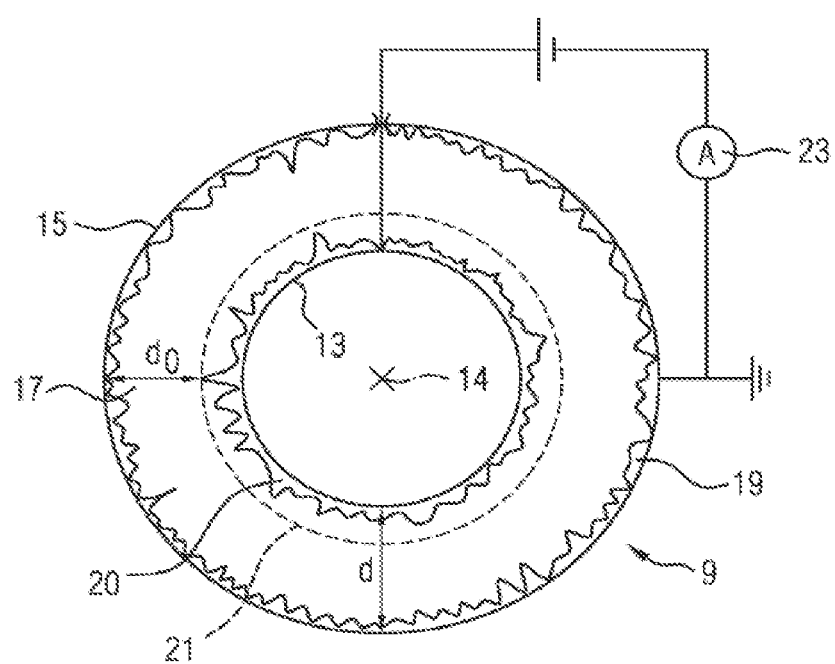
FIG. 2 shows a schematic view of a cross-section through the particle sensor according to FIG. 1.

The particle sensor 9 has, in particular, the task of monitoring the function of the particle filter 7. In some embodiments, such a particle sensor 9 can also be arranged upstream of the particle filter 7, or two particle sensors 9 are provided, one of which is arranged upstream, and one downstream, of the particle filter 7. In order to check the function of the particle filter 7, the particle sensor 9 measures the loading of the stream of exhaust gas with soot particles. In this respect, such a particle sensor 9 is constructed as shown in FIG. 2. FIG. 2 shows a cross section through parts of a particle sensor 9 which comprises an electrostatic particle sensor and is essentially in the form of a cylinder condenser.

In some embodiments, the electrostatic particle sensor 9 has a cylindrical inner electrode 13 and an outer sheath electrode 15, which comprises a cylinder. The inner electrode 13 and the sheath electrode 15 are arranged coaxially with respect to the longitudinal axis 14. A gap 17, which has a width d of 1.3 mm in the embodiment shown, is formed between the inner electrode 13 and the sheath electrode 15.

During the operation of the particle filter 9, a difference in potential between the inner electrode 13 and the sheath electrode 15 is generated by applying a voltage of, for example, 1000 V to the inner electrode 13. The sheath electrode 15 is connected to ground.

During operation, the stream of exhaust gas passes through the gap 17 between the electrodes 13, 15. Negatively and positively charged soot particles are precipitated here out of the exhaust gas and deposited on the inner electrode 13 and/or the sheath electrode 15. As a result, in the course of the operating time of the particle sensor 9, layers 19 and 20 of soot particles build up on the electrodes 13, 15, wherein the layers are composed essentially of individual dendrites.

Owing to the radial electrical field which is present in the gap 17, positively charged soot particles move out of the layer 19 toward the outer sheath electrode 15 if they come close enough to the sheath electrode 15. This is the case when they undershoot the critical distance $d_0$ from the sheath electrode 15, i.e. if the thickness of the layer 19 locally exceeds the value $d-d_0$. The critical distance $d_0$ is indicated in FIG. 2 by the dashed circular line 21. If this distance is undershot, soot particles can become detached from the layer 19 and move toward the outer sheath electrode 15, where they trigger a flow of current which can be measured by the current measuring device 23.

Conversely, particles also become detached from the layer 20 and move to the inner electrode 13 if the thickness of the layer 20 has locally become large enough for the particles to undershoot the distance $d_0$ from the inner electrode 13.

In the schematic illustration in FIG. 2, the size ratios are not illustrated to scale. While d is, as already stated, typically in the millimeter range, $d_0$ is also of this order of magnitude. The thickness of the growing layers 19, 20 is in the micrometer range, and is typically several micrometers.

As has become apparent, increasing amounts of soot particles become detached when the internal combustion engine 3 is switched off. This brings about a briefly particularly high sensor current in the form of a peak. It is to be noted here that although this peak is, on the one hand, "genuine" because it is caused by soot particles which are detected in reality, on the other hand it is not a measure of the soot loading of the exhaust gas at the time of its occurrence but rather characterizes a sudden release of soot particles which have been accumulated over a relatively long time period. In this respect, it is also possible to refer to an artifact of the sensor.

Figure 3:
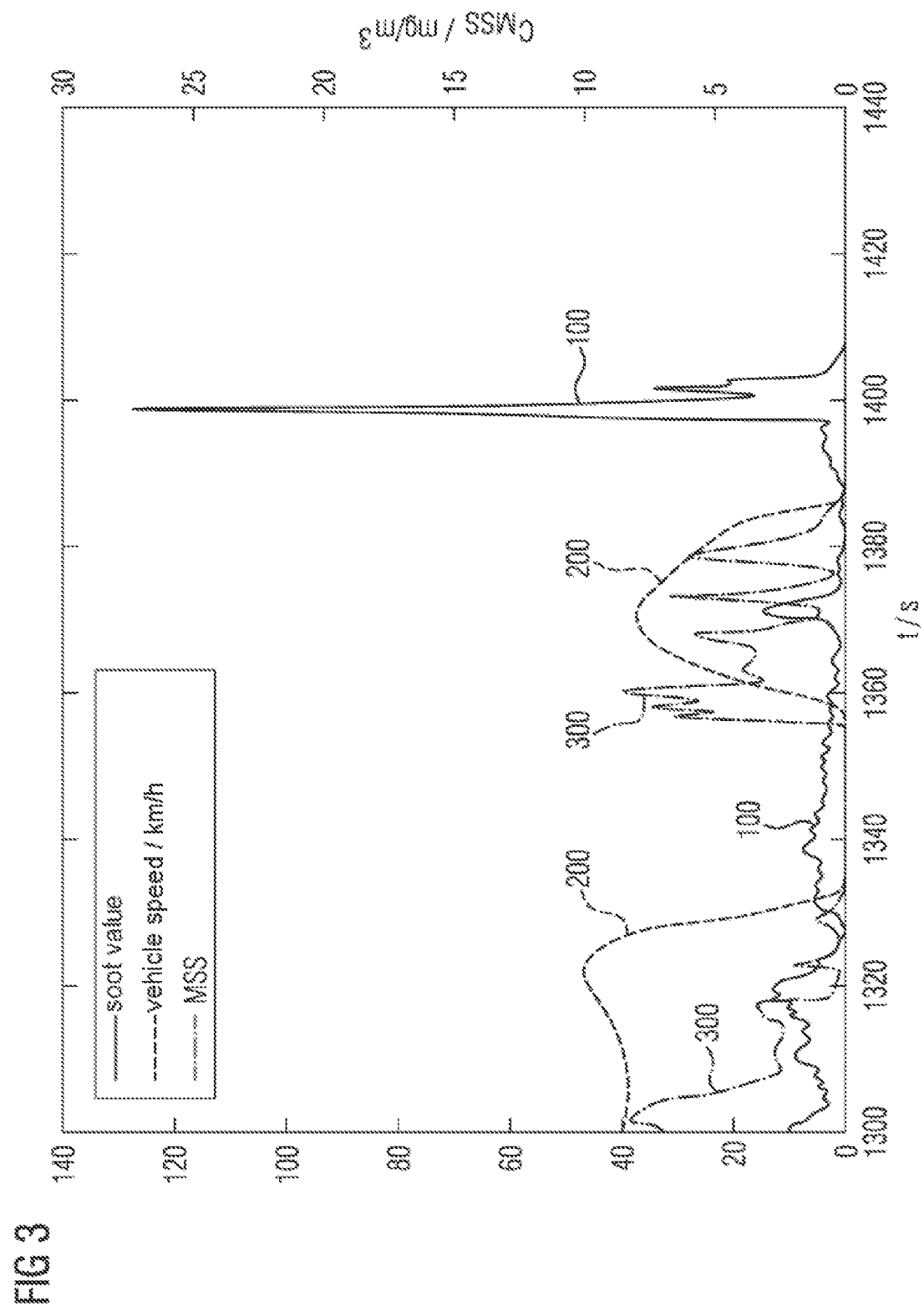
FIG. 3 shows, by way of example, measurement results of, inter alia, the electrostatic particle sensor according to FIG. 2 in order to explain an example method incorporating teachings of the present disclosure for checking the function of the electrostatic particle sensor according to FIG. 2.

This behavior of the particle sensor 9 is, as described below with reference to FIG. 3, used to check the plausibility of the measured values of the particle sensor 9. FIG. 3 shows an exemplary measurement of, inter alia, the electrostatic particle sensor in the exhaust train of a motor vehicle. The measurement results of the electrostatic particle sensor ("soot value") are plotted as the curve 100. The curve 200 shows the speed of the vehicle. The third curve 300 ("MSS") is composed of measured values of a reference measuring device which determines the particle loading in the stream of exhaust gas independently of the electrostatic particle sensor.

At the time around 1390 seconds, the vehicle comes to a stop and the internal combustion engine is switched off. The reference measuring device does not detect a flow of particles any more, and the curve 300 returns to zero. However, the curve 100 shows a significant peak at approximately 1400 seconds. This switch-off peak is a type of artifact of the electrostatic particle sensor which, however, according to the invention is used to check the function of the sensor.

In the present measurement example, a relatively high switch-off peak was detected. In the illustrated time period of 100 seconds before the occurrence of the switch-off peak, a moderate to large quantity was determined in the stream of exhaust gas. This high level of soot loading of the exhaust gas has led to a situation in which a relatively thick layer of soot has been precipitated on the electrodes of the sensor, which layer brought about the switch-off peak after the switching off of the internal combustion engine.

Owing to the high switch-off peak, in the present exemplary measurement it would be assumed that the previously measured, relatively large quantities of soot in the stream of exhaust gas are plausible and the electrostatic particle sensor is reliable.

What is claimed is:

1. A method for checking an electrostatic particle sensor for sensing soot particles in exhaust gases of an internal combustion engine, the method comprising:

generating a sensor current between a first electrode and a second electrode of the particle sensor, wherein the first electrode and the second electrode define a gap through which the exhaust gas flows between the electrodes, by applying a difference in potential between the electrodes, wherein soot particles accumulate on the electrodes and, after a dwell time dependent on the preloading of the electrodes with soot particles, they move from a first electrode to the respective second electrode generating a flow of current as a measure of the quantity of soot in the stream of exhaust gas;

switching off the internal combustion engine;

determining whether a peak in the sensor current is measured after switching off the internal combustion engine;

if a peak is measured, identifying a level of the peak and/or a surface area of the peak to check the function of the particle sensor;

checking a plausibility of measured values of the particle sensor in a time period before switching off the internal combustion engine on the basis of the determined level and/or the surface area of the peak;

wherein measured values of the particle sensor are plausible if:

in the time period no soot was measured in the stream of exhaust gas and no increased sensor current is measured in the form of a peak; or in the time period a small quantity of soot was determined in the stream of exhaust gas and an increased sensor current in the form of a relatively low peak is measured; or in the time period a large quantity of soot was determined in the stream of exhaust gas and an increased sensor current in the form of a relatively high peak is measured; and if no peak in the sensor current is measured, flagging the particle sensor as faulty.

2. The method as claimed in claim 1, further comprising flagging a defective particle filter if in the time period Δt no soot or a small quantity of soot was determined in the stream of exhaust gas and an increased sensor current in the form of a relatively high peak is measured.

3. The method as claimed in claim 1, further comprising checking of the function of the particle sensor each time the internal combustion engine is switched off.

4. The method as claimed in claim 1, further comprising checking the particle sensor at regular intervals.

5. A computer program product comprising a computer-readable medium and program code stored on the computer-readable medium and which, when it is executed on a processor, directs the processor to:

generate a sensor current between a first electrode and a second electrode of the particle sensor, wherein the first electrode and the second electrode define a gap through which the exhaust gas flows between the electrodes, by applying a difference in potential between the electrodes, wherein soot particles accumulate on the electrodes and, after a dwell time dependent on the preloading of the electrodes with soot particles, they move from a first electrode to the respective second electrode generating a flow of current as a measure of the quantity of soot in the stream of exhaust gas;

switch off the internal combustion engine;

determine whether a peak in the sensor current is measured after switching off the internal combustion engine;

if a peak is measured, identify a level of the peak and/or a surface area of the peak to check the function of the particle sensor;

check a plausibility of measured values of the particle sensor in a time period before switching off the internal combustion engine on the basis of the determined level and/or the surface area of the peak;

wherein measured values of the particle sensor are plausible if:

in the time period no soot was measured in the stream of exhaust gas and no increased sensor current is measured in the form of a peak; or in the time period a small quantity of soot was determined in the stream of exhaust gas and an increased sensor current in the form of a relatively low peak is measured; or in the time period a large quantity of soot was determined in the stream of exhaust gas and an increased sensor current in the form of a relatively high peak is measured; and if no peak in the sensor current is measured, flag the particle sensor as faulty.

* * * * *